United States Patent [19]

Sweet

[11] Patent Number: 4,585,830
[45] Date of Patent: Apr. 29, 1986

[54] POLYORGANOSILOXANE COMPOSITIONS USEFUL FOR PREPARING UNSUPPORTED EXTRUDED PROFILES

[75] Inventor: Randall P. Sweet, Midland, Mich.

[73] Assignee: Dow Corning Corporation, Midland, Mich.

[21] Appl. No.: 736,194

[22] Filed: May 20, 1985

[51] Int. Cl.$^4$ .................................................. C08K 3/36
[52] U.S. Cl. ...................................... 524/862; 523/212; 523/213
[58] Field of Search ................. 524/862; 523/212, 213

[56] References Cited

U.S. PATENT DOCUMENTS

| | | | |
|---|---|---|---|
| 2,676,182 | 4/1954 | Daudt et al. | 528/31 |
| 3,122,516 | 2/1964 | Polmanteer . | |
| 3,334,062 | 8/1967 | Brown et al. . | |
| 3,419,593 | 12/1968 | Willing | 528/31 |
| 3,445,420 | 5/1969 | Kookootsedes et al. | 524/862 |
| 3,624,023 | 11/1971 | Hartlage | 524/588 |
| 3,635,743 | 1/1972 | Smith | 106/288 Q |
| 3,697,473 | 10/1972 | Polmanteer et al. | 524/862 |
| 3,989,667 | 11/1976 | Lee et al. . | |
| 4,032,502 | 6/1977 | Lee et al. | 524/862 |
| 4,162,243 | 7/1979 | Lee et al. | 528/31 |
| 4,427,801 | 1/1984 | Sweet | 523/212 |
| 4,477,626 | 10/1984 | Suzuki | 524/862 |
| 4,500,659 | 2/1985 | Kroupa et al. | 523/213 |

*Primary Examiner*—Lewis T. Jacobs
*Attorney, Agent, or Firm*—Robert Spector

[57] ABSTRACT

The presence of immiscible silica treating agents in high viscosity, pumpable polyorganosiloxane compositions alters the rheology of these compositions sufficiently to permit fabrication of unsupported profiles that retain their initial configuration during heat curing. The immiscible treating agent constitutes from 20 to 100 percent by weight of the total treating agent present in the composition.

11 Claims, No Drawings

POLYORGANOSILOXANE COMPOSITIONS USEFUL FOR PREPARING UNSUPPORTED EXTRUDED PROFILES

BACKGROUND OF THE INVENTION

1. Field of the Invention

This invention relates to extrudable polyorganosiloxane compositions. More particularly, this invention relates to polyorganosiloxane compositions capable of being extruded as unsupported profiles such as tubing that retain their shape during curing at elevated temperatures.

2. Background Information

Unsupported extruded profiles of silicone rubber, such as tubing, are typically formed from semi-solid or solid rubber products referred to in the art as "gums" or "gum stocks." The gums are, in turn, usually obtained by blending a polydiorganosiloxane having a viscosity of at least 1000 Pa.s at 25° C. with a reinforcing filler such as silica, a curing agent such as an organoperoxide and any other desired additives on a heated two- or three-roll mill. The resultant sheet of uncured rubber is then fabricated into the desired shape and subsequently cured. To form extruded profiles, a sheet of uncured rubber is typically cut into strips prior to being fed into the barrel of an extruder wherein the rubber is subjected to sufficient heat and pressure to force it through a die of the required configuration. The resultant profile is then cured by heating it at temperatures above 100° C.

The use of gums to form extruded silicone rubber profiles has several disadvantages, including the high cost of the equipment and energy required to process the gum in sheet form, cut the sheet into strips and feed the strips into an extruder capable of generating sufficient pressure to force the plasticized material through the die.

The prior art, for example, U.S. Pat. No. 4,162,243, issued to C. L. Lee et al. on July 24, 1979, and U.S. Pat. No. 4,427,801, issued to R. Sweet on Jan. 24, 1984, disclose extrudable, heat curable silicone rubber compositions exhibiting viscosities ranging from pourable liquids to a consistency resembling petrolatum. All of these compositions will flow at a temperature of 25° C. under pressure, and can therefore be transferred from one location to another by pumping. The use of such pumpable compositions for the fabrication of extruded articles avoids the aforementioned processing disadvantages of gum type silicone rubber.

Attempt to cure unsupported profiles such as tubing formed from heat curable, high consistency, pumpable silicone rubber compositions of the type described in the aforementioned patents to Lee et al. and Sweet have been unsuccessful because the profiles do not retain their initial configuration at the temperatures required to cure the compositions at practical rates using a platinum-catalyzed hydrosilation reaction.

Pumpable polyorganosiloxane compositions typically include finely divided silica as a reinforcing filler and a silica treating agent to prevent a phenomenon referred to as "creping" or "crepe-hardening." Creping is believed to result from an interaction between high molecular weight polydiorganosiloxanes and reactive sites present on the surface of the silica filler. This interaction can result in a substantial increase in the viscosity of the composition to the extent that the composition cannot be readily fabricated. The silica treating agent is usually a relatively low molecular weight hydroxyl endblocked polydiorganosiloxane or a hexaorganodisilazane.

The prior art teaches that the hydrocarbon radicals present in the silica treating agent should be identical to, or at least selected from the same class as those in the polydiorganosiloxane gum or other high molecular weight polymers present in the composition. Liquid, high molecular weight polydimethylsiloxanes are not miscible with silica treating agents wherein more than about 40 percent of the silicon-bonded hydrocarbon groups are octadecyl, phenyl or 3,3,3-trifluoropropyl, making it difficult to prepare a homogeneous silica filled composition containing these ingredients.

The addition of small amounts of immiscible fluorine-containing organosilicon materials as silica treating agents to increase the rate at which highly viscous, marginally processable polydimethylsiloxane compositions can be extruded under a specified set of conditions is disclosed in U.S. Pat. No. 4,500,659, issued to Kroupa and Relyea on Feb. 9, 1985. The concentration of immiscible treating agents is up to 4 weight percent, based on silica weight. Data in this patent demonstrate that above this concentration level the maximum rate at which a composition can be extruded under a given set of conditions was comparable to a control that did not contain the immiscible additive. The advantage of using the immiscible treating agent is no longer apparent.

SUMMARY OF THE INVENTION

The present invention is based on the discovery that when many of the same immiscible silica treating agents taught in the aforementioned Kroupa and Relyea patent are used at concentration levels that are too high for improving flow properties of marginally extrudable compositions, these treating agents alter the rheological properties of less viscous compositions in a manner which permits these compositions to be extruded as unsupported profiles. The profiles retain their initial configuration at curing temperature of at least 70° C.

DETAILED DESCRIPTION OF THE INVENTION

This invention provides a pumpable organosiloxane composition having the consistency of petrolatum at 25° C. and the capability of being extruded as unsupported profiles that retain their initial shapes during curing at temperatures of at least 70° C., said composition comprising the product obtained by blending (A) a triorganosiloxyendblocked polydiorganosiloxane containing at least two vinyl radicals per molecule and exhibiting a viscosity of from 0.1 to 100 Pa.s at 25° C., wherein at least 50% of the silicon-bonded organic radicals are methyl; (B) an organohydrogensiloxane containing at least two silicon-bonded hydrogen atoms per molecule, where said hydrogen atoms are bonded to different silicon atoms and the amount of (B) is sufficient to cure said composition, with the proviso that the sum of the average number of vinyl radicals per molecule of (A) and the average number of silicon-bonded hydrogen atoms per molecule of (B) is at least five; (C) a platinum-containing hydrosilation catalyst in an amount sufficient to promote curing of said composition; (D) optionally, an amount of catalyst inhibitor sufficient to render (C) inactive at temperatures of up to 70° C.; (E) a finely divided silica filler in an amount sufficient to impart the consistency of petrolatum to said composition; and (F) a silica treating agent in an amount sufficient to inhibit crepe hardening of said composition, said composition being characterized by the presence of a silica treating agent wherein from 20 to 100 percent by weight of said silica treating agent is immiscible with said polydiorganosiloxane (A) at 25° C.

The characterizing features of the present compositions are a petrolatum-like consistency, a silica filler, referred to hereinafter as (E), and a relatively large concentration of a silica treating agent that prior to reaction with the silica is immiscible with the vinyl-containing polydiorganosiloxane, referred to hereinafter as (A). The weight of immiscible treating agents should constitute a minimum of about four percent of the silica weight and twenty percent of total treating agent weight in order to modify the rheological properties of a composition sufficiently to permit fabrication of heat curable unsupported profiles. The upper concentration limit for the immiscible portion of the silica treating agent is determined, at least in part, by the rate at which the composition can be extruded under a specified set of conditions.

The compositions requiring the lowest concentration of immiscible treating agent are those containing relatively high concentrations, i.e., 25 weight percent or more, of silica. As the concentration and surface area of the silica decrease the concentration of immiscible treating agent required to form unsupported, heat curable extruded profiles will correspondingly increase. In preferred compositions of this invention containing from 20 to 25 weight percent of silica, the immiscible portion of the silica treating agent constitutes from 20 to 100 weight percent of the total treating agent, referred to hereinafter as (F).

As used in this specification, the term "immiscible" implies that at least a portion of (F) is insoluble in the vinyl-containing polydiorganosiloxane (A) at the concentration level at which said portion is present in the composition.

In addition to being immiscible with (A), the immiscible portion of (F) must, by definition, form a strong chemical or physical bond with the reinforcing silica filler. The surface of the silica filler is believed to contain silicon-bonded hydroxyl groups and/or silicon-bonded oxygen atoms with which a treating agent can associate by chemical and/or physical means.

If the immiscible silica treating agent were not bonded to or otherwise strongly associated with the silica filler particles, the treating agent would, in all likelihood, migrate to the surface of the cured elastomer and exude as a liquid, making the cured elastomer unacceptable for many intended end uses.

Typical silica treating agents include hexaorganodisilazanes and hydroxyl endblocked polydiorganosiloxanes containing up to 20 repeating units per molecule. For (A) and at least a portion of (F) to be immiscible, at least a major portion of the silicon-bonded hydrocarbon or substituted hydrocarbon radicals present in these ingredients must be selected from different classes, i.e., alkyl containing from 1 to 4 carbon atoms, alkyl containing 10 or more carbons, haloalkyl and aryl. For example, if (A) consists essentially of one or more polydimethylsiloxanes, the organic radicals in the immiscible portion of (F) can be aryl such as phenyl, higher alkyl such as octadecyl or haloalkyl such as 3,3,3-trifluoropropyl. Preferably the immiscible portion of (F) is a hydroxyl endblocked poly(3,3,3-trifluoropyl-methyl)siloxane, a hydroxyl endblocked polymethylphenylsiloxane or sym-di(3,3,3-trifluoropropyl)tetramethyldisilazane. When (A) consists essentially of one or more 3,3,3-trifluoropropylmethylsiloxane copolymers, the silica treating agent is preferably hexamethyldisilazane or a hydroxyl endblocked polydimethylsiloxane containing an average of from 10 to 20 repeating units per molecule. These preferences are based on the availability of the silica treating agents and their ability to modify the rheological properties of the composition to enable fabrication of heat curable self supporting extruded profiles.

The rate at which the present compositions can be extruded under a given set of conditions appears to be inversely proportioned to the concentration of the immiscible portion of (F). In order to ensure a commercially practical extrusion rate, the concentration of immiscible treating agent should be no higher than the minimum required to obtain an unsupported profile that retains its shape during fabrication and heat curing. In some instances, as little as four weight percent of immiscible silica treating agent based on the weight of the silica filler, will be sufficient for this purpose. The examples that form part of this specification demonstrate that when the weight of some immiscible silica treating agents exceeds about 25 weight percent of the silica weight in preferred compositions, the extrusion rate for the composition under typical operating conditions decreases to the extent that the compositions are not considered commercially useful extrudable materials. The practical upper weight limit for hydroxyl endblocked polymethylphenylsiloxanes appears to be about 35 weight percent of silica weight. These data indicate that while the practical upper concentration limit are not identical for all immiscible silica treating agents and all compositions, this value can readily be determined by routine experimentation.

The vinyl-containing polydiorganosiloxane portion (A) of the present compositions exhibits a viscosity of from 0.1 to about 100 Pa.s at 25° C. Preferably this range is from 0.4 to 50 Pa.s Polydiorganosiloxanes with viscosities lower than 0.1 Pa.s typically do not yield useful physical property profiles when cured in combination with the other ingredients of the present compositions. When the polydiorganosiloxane exhibits a viscosity greater than about 100 Pa.s, it is often not feasible to add the amount of reinforcing silica filler required to achieve the desired physical properties in the cured article while maintaining a commercially practical extrusion rate.

At least fifty percent of the organic radicals bonded to the silicon atoms of (A) are methyl radicals. Any remaining organic radicals, other than the minimum of two vinyl radicals per molecule required for a curing reaction, can be alkyl other than methyl, substituted alkyl or aryl. These remaining organic radicals are typically alkyl containing from 2 to 10 or more carbon atoms, fluoroalkyl such as 3,3,3-trifluoropropyl, and phenyl. At least 50 mole % of methyl radicals is required to obtain a polymer of useful molecular weight that exhibits a viscosity below 100 Pa.s at 25° C.

Preferably the organic radicals other than vinyl present in (A) are entirely methyl or combinations of methyl with phenyl and/or 3,3,3-trifluoropropyl.

To achieve the desired combination of extrudability of the uncured composition under conventional processing conditions and a useful level of physical properties in the cured fabricated article, (A) is preferably a mixture of at least two triorganosiloxy endblocked polydiorganosiloxanes wherein one polymer exhibits a viscosity of 1 Pa.s or less at 25° C. (equivalent to a molecular weight of about 15,000 or less for a polydimethylsiloxane and a second polymer exhibits a viscosity of at least about 20 Pa.s (equivalent to a molecular weight of at least about 50,000 for a polydimethylsiloxane.

Most preferably (A) is a polydimethylsiloxane composition of the type described in the aforementioned U.S. Pat. No. 4,162,243, issued on July 24, 1979 to C. L. Lee et al., which is incorporated herein in its entirety by reference thereto. This patent discloses mixtures of polyorganosiloxanes which collectively provide a molecular weight distribution such that there is present at least one polymeric species (1) at a concentration greater than the concentrations of polymeric species of lower and higher molecular weight. Polymeric species (1) is described as having a peak molecular weight, determined by gel permeation chromatography in the range of from 68,000 to 135,000. The molecular weight of the lowest molecular weight polymeric species is in the range of from 854 to 3146 and the molecular weight of the highest molecular weight species is in the range of from 174,000 to 370,000. The mixture of the various polymeric species present have a molecular weight distribution such that the dispersity index of the composition has a value greater than 3.8.

Ingredient (A) contains an average of at least two vinyl radicals per molecule. In preferred embodiments a vinyl radical is located at each of the two terminal positions. Alternatively, vinyl radicals can be bonded to nonterminal silicon atoms. If (A) contains only two vinyl radicals per molecule, the organohydrogensiloxane, ingredient (B), should contain at least three silicon-bonded hydrogen atoms per molecule to achieve the desired degree of crosslinking in the cured composition. When (A) contains three or more vinyl radicals per molecule, organohydrogensiloxanes containing two silicon-bonded hydrogen atoms per molecule can be used. The only requirement is that the sum of the average number of vinyl radicals per molecule of (A) and the average number of silicon-bonded hydrogen atoms per molecule of (B) be at least 5 to obtain useful levels of physical properties in the cured, extruded article.

The present compositions typically contain from 1 to 3 silicon-bonded hydrogen atoms per vinyl radical present in the composition.

Organohydrogensiloxanes that react with ingredient (A) of the present composition to yield cured materials are well known, and are described, for example, in U.S. Pat. No. 3,697,473, issued on Oct. 10, 1972 to Polmanteer et al., and in U.S. Pat. No. 3,989,667, issued to Lee et al. on Nov. 2, 1976. These patents are incorporated herein by reference as teachings of suitable organohydrogensiloxanes. As disclosed hereinbefore, ingredient (B) can contain at least two silicon-bonded hydrogen atoms per molecule. The remaining valences of silicon are satisfied by oxygen atoms and hydrocarbon radicals or substituted hydrocarbon radicals. The organohydrogensiloxanes can be homopolymers, copolymers or mixtures thereof containing one or more of $RSiO_{3/2}$, $R_2SiO$, $R_3SiO_{1/2}$ and $SiO_{4/2}$ units, where R represents a monovalent hydrocarbon radical or a monovalent substituted hydrocarbon radical. The only requirement for the selection of R is that ingredients (A) and (B) must be at least partially miscible. Preferably the R radicals are methyl, this preference being based on the availability and cost of the intermediates used to prepare ingredient (B).

Preferred embodiments of (B) include, but are not limited to cyclic polymethylhydrogensiloxanes, copolymers containing trimethylsiloxy and methylhydrogensiloxane units, copolymers containing dimethylhydrogensiloxy and methylhydrogensiloxane units, copolymers containing trimethylsiloxy, dimethylsiloxane and methylhydrogensiloxane units, and siloxanes of the formula $[(CH_3)_2HSiO]_4Si$.

Any of the known platinum-containing hydrosilation catalysts can be used to promote curing of the present compositions, providing that the catalyst is soluble in the vinyl-containing polydiorganosiloxane(s) (A). Insoluble catalysts typically do not provide satisfactory curing. A particularly effective class of catalysts derived from chloroplatinic acid is described in U.S. Pat. No. 3,419,593, issued to Willing on Dec. 31, 1968. This patent is incorporated by reference as a teaching of certain chloroplatinic acid complexes with vinyl-containing organosilicon compounds. A preferred catalyst of this type is a reaction product of chloroplatinic acid and sym-divinyltetramethyldisiloxane.

The catalyst (C) is present in an amount sufficient to provide at least 0.1 part by weight of platinum for every one million parts by weight of (A). Preferably the amount of catalyst is equivalent to from 5 to 50 parts by weight platinum for every one million parts by weight of (A). More than 50 parts per million of platinum are unnecessary and wasteful, especially when preferred catalysts are used.

Mixtures containing the foregoing ingredients (A), (B) and (C) may begin to cure on mixing at room temperature. The addition of a suitable catalyst inhibitor may be required if a one-package organosiloxane composition of this invention is to be stored before converting it to a shaped article or if it is desired to increase the pot life, i.e., the working time, of a 2-package composition.

One useful type of platinum catalyst inhibitor is described in U.S. Pat. No. 3,445,420, issued to Kookootsedes et al. on May 20, 1969, and is hereby incorporated by reference to show certain acetylenic inhibitors and their use. A preferred class of acetylenic inhibitors are the acetylenic alcohols, especially 2-methyl-3-butyn-2-ol.

A second type of platinum catalyst inhibitor is described in U.S. Pat. No. 3,989,667, which issued on Nov. 2, 1976, to Lee and Marko and is hereby incorporated by reference to show certain olefinic siloxanes, their preparation and their use as platinum catalyst inhibitors in organosiloxane compositions.

A third type of platinum catalyst inhibitor includes polymethylvinylcyclosiloxanes having three to six methylvinylsiloxane units per molecule.

An optimum concentration of platinum catalyst inhibitor in an organosiloxane composition of this invention will provide the desired storage stability or pot life at ambient temperature without excessively prolonging the time interval required to cure the composition at temperatures above about 70° C. This amount can vary widely and will depend upon the particular inhibitor that is used, the nature and concentration of the platinum-containing catalyst and the nature of the organohydrogensiloxane.

Inhibitor concentrations as low as one mole of inhibitor per mole of platinum will in some instances yield a desirable level of storage stability and a sufficiently short curing period at temperatures above about 70° C. In other cases, inhibitor concentrations of up to 10, 50, 100, 500 or more moles per mole of platinum may be needed. The optimum concentration range for a particular inhibitor in a given composition can be determined by routine experimentation.

The reinforcing silica filler (ingredient E) employed in the present organosiloxane compositions can be of any of the available types of finely divided amorphous silica having a surface area of at least 50 square meters per gram ($m^2/g$). Two preferred silicas are referred to as fumed silica and precipitated silica. These silicas typically have surface areas greater than 50 $m^2/g$.

The concentration of silica filler is sufficient to impart the consistency of petrolatum to the composition. The present compositions typically will not flow under atmospheric pressure but will do so under a pressure of about 600 kilopascals. When a spatula or similar implement is inserted and withdrawn from a pumpable composition of the invention, the portion of the composition that adheres to and finally breaks away from the spatula as it is being withdrawn does not immediately flow back into the body of the composition.

The concentration of silica that will yield a non-flowing but pumpable petrolatum-like material is dependent, at least in part, on the viscosity of the vinyl-containing polydiorganosiloxane(s), ingredient (A). If the viscosity of (A) is from 20 to 40 Pa.s, the concentration of silica is typically from 30 to 50 parts by weight per 100 parts by weight of (A). The optimum silica concentration range for a given composition can be determined by those skilled in this art using a minimum of routine experimentation.

The silica filler can be treated with an immiscible treating agent of this invention prior to being combined with the other ingredients of the present compositions. Preferably the silica is treated in situ during preparation of the composition. Methods for pretreating reinforcing silica using organosilanes, organosiloxanes and silazanes as treating agents are described in the prior art, including U.S. Pat. No. 3,122,516, issued Feb. 25, 1969 to Polmanteer; U.S. Pat. No. 3,334,062 issued Aug. 1, 1967 to Brown and Hyde; U.S. Pat. No. 3,635,743, issued Jan. 18, 1972, to Smith; and U.S. Pat. No. 3,624,023, issued Nov. 30, 1977 to Hartage. These patents are incorporated herein by reference to show the preparation of treated reinforcing silica fillers.

Irrespective of whether the silica filler is pretreated or treated in situ during preparation of the present compositions, the silica treating agent includes at least one of the immiscible compounds described hereinbefore.

The amount of immiscible silica treating agent required to form an unsupported, heat curable extruded profile may be insufficient to prevent or inhibit crepe hardening. In such instances the immiscible silica treating agent can be used in combination with one or more compatible treating agents. These conventional silica treating agents are soluble in, or at least compatible with the other components of the organosiloxane composition, particularly ingredient (A), and include alkoxy- or hydroxyl-containing silanes, silazanes, and alkoxy- or hydroxyl-containing siloxanes. Hexamethyldisilazane and low molecular weight hydroxyl- or alkoxy endblocked polydimethylsiloxanes and polymethylvinylsiloxanes containing an average of from 2 to about 20 siloxane units per molecule constitute a preferred class of compatible treating agents when (A) contains at least one polydimethylsiloxane.

Liquid hydroxyl endblocked dimethylsiloxane/methylvinylsiloxane copolymers containing an average of from one to two dimethylsiloxane units for every methylvinylsiloxane unit can be included as compatible silica treating agents because of the high levels of tensile properties of the cured composition relative to compositions that do not contain these treating agents.

The total amount of silica treating agent to be used in the extrudable compositions of this invention is at least partially dependent on the type of agents employed and the total surface area of the silica filler. As the filler surface area increases, a proportional increase in the amount of treating agent is usually required to prevent or inhibit crepe hardening. Methods for determining the amount of treating agent suitable for use with a given type of silica filler are known in the art. When hexamethyldisilazane or a hydroxyl endblocked liquid polydimethylsiloxane are used as the compatible portion of (F), the total amount of treating agent required, which includes both incompatible and compatible portions, will typically be from 10 to 30 parts by weight of treating agent per 100 parts by weight of silica present in the composition.

In addition to the aforementioned ingredients (A)-(F), the compositions of this invention can include conventional optional additives and modifiers such as pigments, extending fillers, flame retardants, and heat stabilizers.

A preferred additive for improving the tensile properties of cured elastomers prepared by using an organosiloxane composition of this invention is a class of benzene-soluble resinous, hydroxylated organosiloxane copolymers characterized by repeating units of the formulae (a) $R_2^1(CH_2=CH)SiO_{0.5}$, (b) $R_3^2SiO_{0.5}$, and (c) $SiO_{4/2}$, where $R^1$ and $R^2$ individually represent alkyl radicals containing from 1 to 4 carbon atoms, with the proviso that at least 95% of $R^1$ and $R^2$ are methyl. Most preferably all the $R^1$ and $R^2$ groups are methyl. Units represented by formula (a) constitute from 3 to 10 mol % of the copolymer and the molar ratio of the combination of (a) and (b) units to (c) units is from 0.6:1 to 1.1:1.

Resinous copolymers containing the aforementioned (a), (b), and (c) units can be prepared using a modification of the procedure described in U.S. Pat. No. 2,676,182, which issued on Apr. 20, 1954 to Daudt and Tyler, and is incorporated herein in its entirety by reference thereto. The copolymers described in this patent contain from 2 to 3 percent by weight of hydroxyl groups, which is considerably above the level of about 0.7 weight percent desired for a resinous copolymer component of the present compositions. The hydroxyl content of the resin is conveniently reduced to the desired level by employing a higher concentration of triorganosiloxane capping agent, or a precursor thereof, than the concentration range taught in the aforementioned U.S. Pat. No. 2,676,182. Briefly, the method of Daudt and Tyler comprises reacting under acidic conditions a silica hydrosol with at least one triorganosubstituted siloxane, such as hexamethyldisiloxane, or hydrolyzable triorganosilanes such as trimethylchlorosilane. The reaction mixture would also include an amount of a vinyl-containing silazane, siloxane, or silane sufficient to provide from 3 to about 10 mol % of vinyl-containing siloxane groups in the final copolymer.

The concentration of resinous organosiloxane copolymer in the pumpable compositions of this invention will influence the physical properties achieved following curing. Less than about 10%, based on the weight of (A), will not yield any significant improvement in durometer and tensile strength of the final cured elastomer, while more than about 50% by weight will increase the viscosity of the curable composition to the extent that it cannot be processed at a practical rate under the conditions of temperature and pressure employed in commercial pumps and extruders.

The viscosity of pumpable compositions containing the aforementioned resinous organosiloxane copolymer as an additive is a function of at least three parameters, namely the viscosity of (A), the concentration of silica, and the concentration of organosiloxane copolymer. Using the viscosity range for (A) of 1 to 100 Pa.s at 25° C. and typical values for reinforcing silica content of 10 to 60 parts by weight per 100 parts by weight of (A), the optimum concentration range for the organosiloxane copolymer appears to be from about 10 to about 40 parts by weight per 100 parts of (A).

It will be understood that as the viscosity of (A) and/or the silica content increase, it may be necessary to reduce the concentration of any resinous organosiloxane copolymer to obtain a commercially useful pumpable composition of this invention. Alternatively, the silica content and/or the viscosity of (A) can be reduced if it is desired to employ more than about 40% of the copolymer, based on the weight of (A).

All of the ingredients of the present organosiloxane compositions can be incorporated into a single package which is usually stable for at least several hours if the temperature will not exceed about 40° C., and particularly if one of the aforementioned catalyst inhibitors is present.

If the present compositions will be stored for extended periods of time or exposed to temperatures above about 40° C. prior to shaping and curing them, it is usually preferable to package the organohydrogensiloxane and the platinum catalyst in separate containers and combine them just prior to use.

In preferred embodiment of a 2-package composition, a homogeneous mixture containing all of the components of a composition except the catalyst, inhibitor and organohydrogensiloxane is divided into two substantially equal portions. One portion is combined with the catalyst and the second portion is combined with the catalyst inhibitor and the organohydrogensiloxane. The two resultant mixtures are blended together when it is desired to fabricate and cure the composition.

The pumpable compositions of this invention are conveniently prepared using conventional mixing equipment, including dough type mixers manufactured by Baker Perkins, Inc. The order of addition of the various components is not critical if the composition will be fabricated into a shaped article shortly after being prepared.

To facilitate processing of the composition, at least a portion of the vinyl-containing polydiorganosiloxane(s) (A) and all of the silica treating agents (F) together with the optional resinous organosiloxane polymers described hereinbefore are blended together, following which the silica filler is gradually added. The resultant mixture is then simultaneously heated and stirred to treat the filler. Any remaining portion of (A) is then added, followed by the organohydrogensiloxane, catalyst and the optional catalyst inhibitor.

As previously disclosed, the use of known catalyst inhibitors will allow a mixture containing all of the components of the present compositions to be stored for substantial periods of time at temperatures of up to about 40° C. without adversely affecting the ability of the composition to cure relatively rapidly at temperatures of 100° C. and above.

The pumpable organosiloxane compositions of this invention can be formed into extruded profiles and other shapes by conventional methods. The rheological properties of these compositions make them eminently suitable for extrusion into tubing exhibiting inside diameters of up to about 8 mm. and wall thickness as low as about 0.8 mm. During extrusion the composition is forced around a mandrel and through a circular die under pressures that are typically in the order of 600 kPa. The tubing or other profile is cured by heating it at a temperature of at least 70° C. for a period of time sufficient to overcome the effect of any inhibitor present and obtain a cured article. Typical curing conditions are from 100° to 200° C. for a period of from 1 to 60 minutes.

A preferred method for curing extruded profiles is to pass the profile directly from the extrusion die through an open ended chamber or tunnel wherein air heated to a temperature of about 150° C. is circulated around the article. The residence time in the chamber is typically from 1 to 5 minutes.

The consistency of preferred pumpable compositions is such that they can be extruded through a 3.2 mm-diameter circular orifice at a rate of at least 10 grams per minute under a pressure of 600 kPa at 25° C. Preferred compositions can be fabricated using conventional twin screw extruders. Alternatively, unsupported profiles can be fabricated by securing the appropriate die to the outlet side of the pump used to transport the composition from its storage container or the mixer wherein the ingredients of the composition are blended.

The following examples disclose pumpable organosiloxane compositions containing preferred immiscible silica treating agents, and should not be interpreted as limiting the scope of the organosiloxane compositions encompassed by the accompanying claims. All parts and percentages are by weight unless otherwise specified.

EXAMPLE 1

This example demonstrates the effect of adding an immiscible fluorine-containing silica treating agent to a pumpable polydimethylsiloxane composition.

A master batch was prepared in a dough type sigma blade mixer by gradually adding 560 parts of fume silica (MS-75, available from Cabot Corporation) to a mixture of 700 parts of a dimethylvinylsiloxy endblocked polydimethylsiloxane exhibiting a viscosity of about 30 Pa.s at 25° C., 30 parts water and 100 parts of sym-di(3,3,3-trifluoropropyl)tetramethyldisilazane as the silica treating agent. The resultant mixture was heated for one hour at 140° C. under reduced pressure to remove volatile materials. This product was then diluted with 372 parts of the aforementioned polydimethylsiloxane exhibiting a viscosity of about 30 Pa.s and 528 parts of a dimethylvinylsiloxy endblocked polydimethylsiloxane exhibiting a viscosity of about 0.4 Pa.s at 25° C. The resultant mixture (100 parts) was blended to homogeneity with 0.2 parts of a complex formed by reacting chloroplatinic acid with sym-divinyltetramethyldisiloxane and diluting the resultant complex with sufficient liquid dimethylvinylsiloxy endblocked polydimethylsiloxane to achieve a platinum content of 0.7 weight percent, 1.3 parts of a liquid trimethylsiloxy endblocked dimethylsiloxane/methylhydrogensiloxane copolymer containing about 62 mol percent methylhydrogensiloxane units and a silicon-bonded hydrogen concentration of about 0.7 percent, and 0.03 part of 2-methyl-3-butyn-2-ol as a catalyst inhibitor. The preparation of this type of platinum catalyst is described in U.S. Pat. No. 3,419,593, which is hereby incorporated in its entirety by reference thereto. The consistency of the resultant composition resembled that of a thick grease or petrolatum.

The composition was extruded in the form of a continuous "U" shaped channel having an inner width of 1.4 mm, an inner depth of 3.8 mm and an average wall thickness of 0.9 mm. A portion of the composition was extruded through a Garvey type extrusion die described in ASTM Test Procedure D 2230. Sections of each profile measuring about 31 cm. in length were cured by heating them for five minutes at a temperature of 204° C. Both profiles retained their initial configuration when cured.

EXAMPLE 2

This example demonstrates the variations in rheology and physical properties following curing that were achieved by varying the type and concentration of immiscible silica treating agent.

Noncurable compositions containing one of three different immiscible silica treating agents were prepared using one of the six procedures I–VI described hereinbelow. The immiscible treating agents were sym-di(3,3,3-trifluoropropyl)tetramethyldisilazane ($F^1$), a hydroxyl endblocked poly(methyl-3,3,3-trifluoropropyl)siloxane containing about six weight percent of hydroxyl groups ($F^2$) and a hydroxyl endblocked polymethylphenylsiloxane ($F^3$) exhibiting a viscosity of about 0.5 Pa.s at 25° C. In some instances the immiscible treating agent was used in combination with hexamethyldisilazane (HMDS) as indicated in Table 1.

Preparative method I—33 parts of a dimethylvinylsiloxy endblocked polydimethylsiloxane ($A^1$) exhibiting a viscosity of about 2 Pa.s at 25° C., 18.9 parts of a dimethylvinylsiloxy endblocked polydimethylsiloxane ($A^2$) exhibiting a viscosity of about 30 Pa.s at 25° C., 1.18 parts of a hydroxyl endblocked dimethylsiloxane/methylvinylsiloxane containing an average of 3.5 dimethylsiloxane units and 2.0 methylvinylsiloxane units per molecule and 1.95 parts of water were placed in the chamber of a dough type mixer manufactured by Baker Perkins Corporation and blended for five minutes. At this time the silica treating agent listed in the accompanying Table 1 were added and stirring continued for an additional five minutes. A 34.6 part portion of fume silica exhibiting a particle size of 250 m²/g was gradually added, following which the mixture was blended for 30 minutes under ambient conditions. The chamber of the mixer was then heated at 140° C. and the contents of the chamber placed under a reduced presence of 5 Pa.s while mixing was continued for one hour, following which 48.5 parts of $A^2$ were added and the mixture allowed to cool to ambient temperature while being blended. At this time 1.35 parts of a hydroxyl endblocked polydimethylsiloxane containing 4 percent by weight of hydroxyl groups, 0.037 part 2-methyl-3-butyl-2-ol and 2.7 parts of the dimethylsiloxane/methylhydrogensiloxane described in Example 1 were added. The resultant mixture was then blended for 10 minutes to obtain a homogeneous composition.

Preparative method II—Identical to procedure I except that the amount of $A^2$ in the initial mixture was increased from 18.9 to 51.2 parts and $A^1$ was omitted. Thirty-three parts of $A^1$ and 15.8 parts of $A^2$ were added following heating of the mixture as described in preparative method I.

Preparative method III—Identical to method I except for the omission of water and the addition of 0.05 part ammonium carbonate following completion of the silica addition.

Preparative method IV—Identical to method I except for a change in the amount of water from 1.95 part to 0.5 part and addition of 0.05 part of ammonium carbonate following completion of the silica addition.

Preparative method V—Identical to method III, except for a change in the amount of ammonium carbonate from 0.05 part to 0.1 part.

Preparative method VI—Identical to method IV except for a reduction in the amount of water from 0.5 part to 0.3 part.

All of the compositions exhibited the consistency of petrolatum.

TABLE 1

| Composition | Preparative Method | Treating Agent | Weight % Immiscible Agent |
|---|---|---|---|
| 1 | I | 8 parts $F^1$, 0 parts HMDS | 5.3 |
| 2 | II | 6 parts $F^1$, 2 parts HMDS | 4.0 |
| 3 | II | 5 parts $F^1$, 3 parts HMDS | 3.3 |
| 4 | II | 4 parts $F^1$, 4 parts HMDS | 2.7 |
| 5 | III | 8 parts $F^2$, 0 parts HMDS | 5.4 |
| 6 | IV | 6 parts $F^2$, 2 parts HMDS | 4.1 |
| 7 | V | 5 parts $F^2$, 3 parts HMDS | 3.4 |
| 8 | VI | 4 parts $F^2$, 4 parts HMDS | 2.7 |
| 9 | V | 12 parts $F^3$, 0 parts HMDS | 7.9 |
| 10 | VI | 10 parts $F^3$, 2 parts HMDS | 6.6 |
| 11 | VI | 6 parts $F^3$, 4 parts HMDS | 4.0 |
| 12 | VI | 4 parts $F^3$, 4 parts HMDS | 2.6 |

Each of the twelve compositions was extruded using a device equipped with a plunger that forced the composition through a circular die measuring 4 cm in diameter. The resultant solid rods measured from 0.5 to 2.9 cm. in length, and remained attached to the extrusion device. The device and the extrudate were then heated for 10 minutes at a temperature of 150° C. with the extruded rod unsupported and in a horizontal position. The rod was observed at the end of the heating period to determine whether any sagging or "slumping" had occurred during heating. The maximum length that could be extruded without "slumping" being observed is recorded in the following table.

TABLE 2

| Composition | Maximum Length Without "Slumping" (cm.) | Composition | Maximum Length Without "Slumping" (cm.) |
|---|---|---|---|
| 1 | 2.9 | 7 | 0.5 |
| 2 | 0.6 | 8 | 0.3 |
| 3 | 0.3 | 9 | 3.2 |
| 4 | 0.2 | 10 | 2.9 |
| 5 | 2.9 | 11 | 0.6 |
| 6 | 1.0 | 12 | 0.5 |

The rates at which the compositions could be extruded through a 0.32 cm. diameter orifice under a pressure of 552 kPa. ranging from a maximum of 132 grams per minute for composition 4 to 0.2 grams per minute for composition 9. The extrusion rate was inversely proportional to the concentration of a given immiscible silica treating agent.

EXAMPLE 3

This example provides a correlation between the length of extruded profile obtained from a given formulation using the procedure described hereinbefore in Example 2 and the quality of extruded, cured tubing that can be obtained using the same formulation.

Five compositions were prepared as described hereinbefore in preparative method I of Example 2. Polydiorganosiloxane $A^1$ was used alone and in two mixtures, referred to in the accompanying table as $M^1$ and $M^2$. $M^1$ contained $A^1$ and $A^2$ in a weight ratio of 1:2, respectively, and exhibited a viscosity of 22.6 Pa.s at 25° C. The weight ratio $A^1:A^2$ in $M^2$ was 13:87, and the mixture exhibited a viscosity of 45.6 Pa.s at 25° C. The viscosity of $A^1$ was 0.4 Pa.s at 25° C.

The materials initially added to the mixer chamber included an amount of $A^1$, $M^1$ or $M^2$ equivalent to 1.25 times the weight of silica, 1.18 parts of the hydroxyl endblocked dimethylsiloxane/methylvinylsiloxane copolymer described in Example 2 and 1.95 parts of water.

The immiscible silica treating agent was sym-di-3,3,3-trifluoropropyltetramethyldisilazane alone or in combination with hexamethyldisilazane, a miscible treating agent, to provide a total of eight parts of treating agent. The percent of immiscible treating agent in each composition is specified in the following Table 3. The amounts of trimethylsiloxy endblocked dimethylsiloxane/methylhydrogensiloxane copolymer and silica present is also specified in the following table. In addition to all the ingredients of preparative method I, the compositions also contained 0.1 percent by weight of the catalyst described hereinbefore in Example 1. The preparation of this type of catalyst is described in U.S. Pat. No. 3,419,593 which is incorporated herein in its entirety by reference thereto. The catalyst was added after the composition had been removed from the Baker Perkins mixer. The final compositions exhibited the consistency of petrolatum.

Within about 2 hours after being prepared, the final compositions were evaluated for slumping using the method and device described hereinbefore in Example 2. The compositions were also extruded as tubing using a 0.6 cm. diameter circular die and a 0.3 cm. diameter mandrel. The tubing was cured for from 1 to 5 minutes in a circulating air oven maintained at a temperature of 150° C.

The concentricity of the cured tubing provided an indication of the extent to which the tubing had collapsed during curing. The concentricity was subjectively evaluated as "good" or "poor" by visually examining each sample of tubing and comparing the samples with one another. These ratings together with the extent to which the extruded rod-like profiles slumped using the test procedure described hereinbefore in Example 2 are recorded in the following table. Composition 13 produced tubing that was on the borderline between a "good" and "poor" rating. Composition 16 contained no immiscible treating agent, and produced tubing which slumped during curing, even though the maximum length of nonslumping solid rod was substantially identical to that of composition 13. Sample 17 did not contain enough of the immiscible silica treating agent to compensate for the lower viscosity of the polydimethylsiloxane ingredient and the lower silica content relative to composition 14.

These data demonstrate that the amount of immiscible silica treating agent required to produce unsupported, extruded profiles that retain their initial shape during curing is dependent, at least in part, on the viscosity of the composition, which is, in turn, a function of polydimethylsiloxane viscosity and silica content.

TABLE 3

| Composition | Polydimethyl Siloxane Viscosity (Pa · s) | % Immiscible Treating Agent | Silica/organo-hydrogensiloxane (parts) | Maximum Length Without Slumping (cm.) | Tubing Concentricity |
|---|---|---|---|---|---|
| 13 (invention) | 45.6 | 50 | 40/2.13 | 0.48 | Good (Borderline) |
| 14 (invention) | 22.6 | 100 | 40/2.7 | 2.5 | Good |
| 15 (invention) | 0.4 | 100 | 35/4.5 | 0.64 | Good |
| 16 (comparison) | 22.6 | 0 | 40/2.7 | 0.48 | Poor |
| 17 (comparison) | 22.6 | 50 | 35/2.7 | 0.32 | Poor |

That which is claimed is:

1. A pumpable organosiloxane composition having the consistency of petrolatum at 25° C. and the capability of being extruded as unsupported profiles that retain their initial shape during curing at temperatures of at least 70° C., said composition comprising the product obtained by blending
   (A) a triorganosiloxy-endblocked polydiorganosiloxane containing at least two vinyl radicals per molecule and exhibiting a viscosity of 0.1 to 100 Pa.s at 25° C., wherein at least 50% of the silicon-bonded hydrocarbon groups are methyl;
   (B) an organohydrogensiloxane containing at least two silicon-bonded hydrogen atoms per molecule, where said hydrogen atoms are bonded to different silicon atoms and the amount of (B) is sufficient to cure said composition, with the proviso that the sum of the average number of vinyl radicals per molecule of (A) and the average number of silicon-bonded hydrogen atoms per molecule of (B) is at least five;
   (C) a platinum-containing hydrosilation catalyst in an amount sufficient to promote curing of said composition;
   (D) optionally, an amount of catalyst inhibitor sufficient to render (C) inactive at temperatures up to 70° C.;
   (E) a finely divided silica filler in an amount sufficient to impart the consistency of petrolatum to said composition; and
   (F) a silica treating agent in an amount sufficient to inhibit crepe hardening of said composition,
   said composition being characterized by the presence of a silica treating agent wherein from 20 to 100 percent by weight of said treating agent is immiscible with said polydiorganosiloxane (A) at 25° C.

2. A composition according to claim 1 in which (A) consists essentially of at least one polydimethylsiloxane or a dimethylsiloxane/methyl-3,3,3-trifluoropropylsiloxane copolymer.

3. A composition according to claim 2 in which (A) consists essentially of a mixture of polydimethylsiloxane that collectively provides a molecular weight distribution such that there is present at least one polymeric species (1) at a concentration greater than the concentrations of polymeric species of lower and higher molecular weight; polymeric species (1) having a peak molecular weight, determined by gel permeation chromatography in the range of from 68,000 to 135,000; the molecular weight of the lowest molecular weight polymeric species is in the range of from 854 to 3146 and the molecular weight of the highest molecular weight species is in the range of from 174,000 to 370,000; and the mixture of the various polymeric species present have a molecular weight distribution such that the dispersity index of the composition has a value greater than 3.8.

4. A composition according to claim 1 in which the viscosity of (A) is from 0.4 to 50 Pa.s at 25° C.

5. A composition according to claim 1 in which the organohydrogensiloxane contains at least three silicon-bonded hydrogen atoms per molecule.

6. A composition according to claim 5 in which the organohydrogensiloxane is a dimethylsiloxane/methylhydrogensiloxane copolymer.

7. A composition according to claim 1 in which the silica content is from 30 to 50 parts by weight per 100 parts of (A).

8. A composition according to claim 1 in which the silica treating agent includes at least one compound that is miscible with the polydiorganosiloxane (A) and the immiscible portion constitutes at least 20 percent by weight of the total treating agent.

9. A composition according to claim 1 in which the silicon-bonded hydrocarbon radicals other than methyl present in the immiscible silica treating agent are selected from the group consisting of 3,3,3-trifluoropropyl and phenyl and (A) comprises at least one polydimethylsiloxane.

10. A composition according to claim 9 in which the immiscible treating agent is selected from the group consisting of hydroxy endblocked poly(methyl-3,3,3-trifluoropropyl)siloxanes, hydroxyl endblocked poly(methylphenyl)siloxanes and sym-di-3,3,3-trifluoropropyltetramethyldisilazane.

11. A composition according to claim 1 in which ingredient (A) consists essentially of at least one polydiorganosiloxane wherein from 20 to 50 percent of the hydrocarbon radicals are 3,3,3-trifluoropropyl and the immiscible portion of the silica treating agent is hexamethyldisilazane or a hydroxyl endblocked polydimethylsiloxane.

* * * * *